(12) United States Patent
Franjo et al.

(10) Patent No.: US 6,679,399 B2
(45) Date of Patent: Jan. 20, 2004

(54) FUEL TANK FASTENERS

(75) Inventors: Vladimir Franjo, Windsor (CA); Christopher K. Quick, Windsor (CA)

(73) Assignee: TI Group Automotive Systems LLC, Warren, MI (US)

( * ) Notice: Subject to any disclaimer, the term of this patent is extended or adjusted under 35 U.S.C. 154(b) by 3 days.

(21) Appl. No.: 10/058,915

(22) Filed: Jan. 28, 2002

(65) Prior Publication Data

US 2003/0141304 A1 Jul. 31, 2003

(51) Int. Cl.⁷ ............................ B60P 3/00; B65D 88/12
(52) U.S. Cl. ...................... 220/562; 220/4.14; 220/443; 220/23.4
(58) Field of Search ................. 220/562, 4.14, 220/4.13, 23.4, 23.86

(56) References Cited

U.S. PATENT DOCUMENTS 4,673,102 A * 6/1987 Bullock, Jr. ............. 220/62.22
5,515,997 A * 5/1996 Kirk et al. .................. 220/562
5,547,096 A * 8/1996 Kleyn ........................ 220/4.14
6,367,650 B1 * 4/2002 Kuehnemund et al. ..... 220/651
6,595,382 B2 * 7/2003 Ettlinger ................ 220/560.11

* cited by examiner

*Primary Examiner*—Joseph Man-Fu Moy
(74) *Attorney, Agent, or Firm*—Reising, Ethington, Barnes, Kisselle, P.C.

(57) ABSTRACT

An integral fuel tank fastener having a unitary fastener feature or hollow protuberance carried by and formed into a preferably blow molded multi-layer plastic fuel tank shell. The fuel tank shell preferably has a continuous intermediate layer, or permeation barrier, between continuous inner and outer layers in which the protuberance is formed without producing any discontinuities that could degrade the permeation integrity of the fuel tank. The hollow protuberance projects into a fuel chamber defined by the inner layer and has an enlarged head at its distal end. The outer layer defines a blind cavity of the hollow protuberance which substantially follows the contours of the opposite side. A female clip, independent of the fuel tank, preferably engages the protuberance about the inner layer of the shell.

14 Claims, 3 Drawing Sheets

FUEL TANK FASTENERS

TECHNICAL FIELD OF THE INVENTION

This invention relates to an integral fuel tank fastener, and more particularly to a method of blow molding a plastic fuel tank having a unitary fastener feature for engaging a clip of the fastener.

BACKGROUND OF THE INVENTION

High fuel economy in today's automotive vehicles is imperative. Any opportunity to reduce the weight of a vehicle and thereby minimize fuel consumption is thoroughly considered against the material and manufacturing cost of the lighter component. In most vehicles, the traditional steel fuel tank has been replaced with a lighter plastic fuel tank. However, the plastic, or high density polyethylene, fuel tank must be manufactured having a series of continuous layers having unique compositions and performance characteristics.

Of the series of layers, an intermediate layer is known as a permeation barrier which prevents the migration of fuel vapor or hydrocarbon emissions through the walls of the fuel tank. This barrier is required to meet regulatory hydrocarbon fuel emission standards. Consequently, any penetrations or alternate materials, such as fasteners, extending through this barrier must be thoroughly sealed and non-porous. In order to seal a fuel tank penetration, extra parts, leading to an increase in weight and higher manufacturing and maintenance costs, are required.

SUMMARY OF THE INVENTION

This invention provides an integral fuel tank fastener having a unitary fastener feature or hollow protuberance carried by and formed into a preferably blow molded multi-layered plastic fuel tank shell. The fuel tank shell preferably has a continuous intermediate layer, or permeation barrier between continuous inner and outer layers which the protuberance without producing any discontinuities that would degrade the permeation integrity of the fuel tank. The hollow protuberance projects into a fuel chamber defined by the inner layer and has an enlarged head at its distal end. The outer layer defines a blind cavity of the hollow protuberance which substantially follows the contour of the opposite side. A clip, independent of the fuel tank, preferably engages the inner layer about the protuberance.

In order to form the hollow protuberance, a collapsible mini-core tool is pressed against the outer layer of the fuel tank shell, preferably after the tank is blow molded, but while it is still pliable within the mold so as not to penetrate the shell and to achieve better wall thickness distribution. The tool is radially expanded and forms the hollow detent. The shell is then cooled prior to collapsing and withdrawing the tool.

Objects, features and advantages of this invention include providing a unitary fastener feature in a multi-layered fuel tank shell without breaching the continuous permeation barrier or increasing fuel emissions from the tank. The invention provides a fastener with a limited number of parts while providing of relatively simple design, low cost manufacture and assembly and is rugged, durable, reliable, and in service has a long useful life.

BRIEF DESCRIPTION OF THE DRAWINGS

These and other objects, features and advantages of this invention will be apparent from the following detailed description of the best mode, appended claims and accompanied drawings in which:

DETAILED DESCRIPTION OF THE PREFERRED EMBODIMENTS

Figure 1:
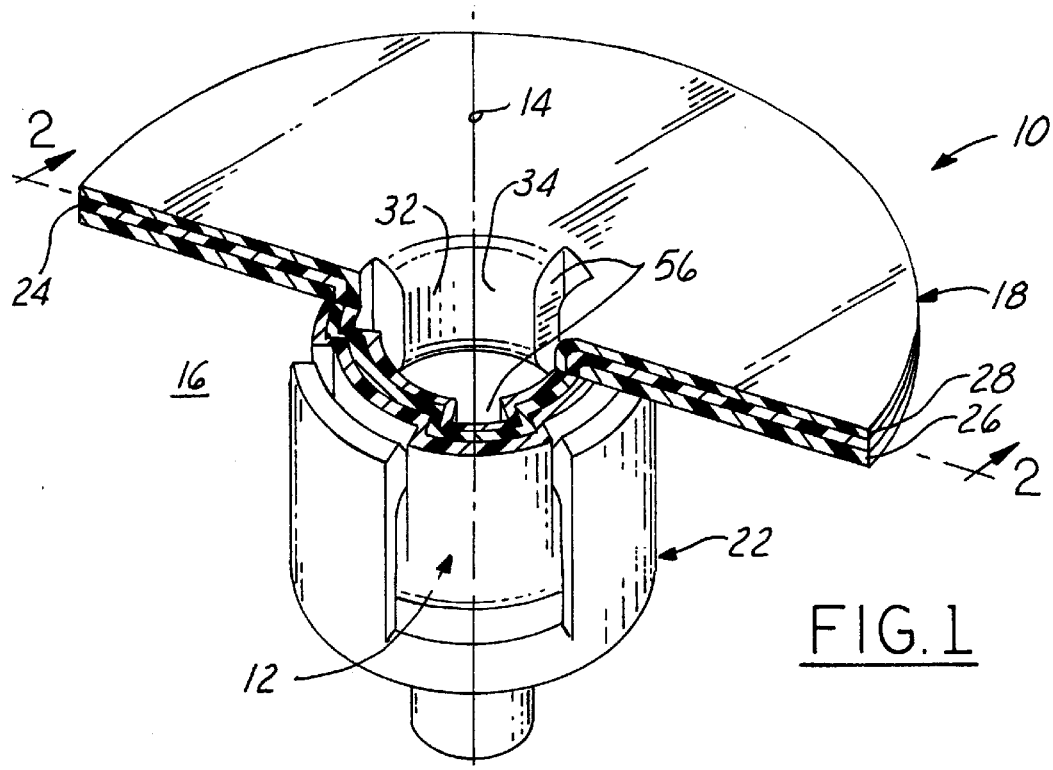
FIG. 1 is a partial cross-sectional, perspective view of an integral fuel tank fastener of the present invention with a male clip removed to show internal detail.
Figure 2:
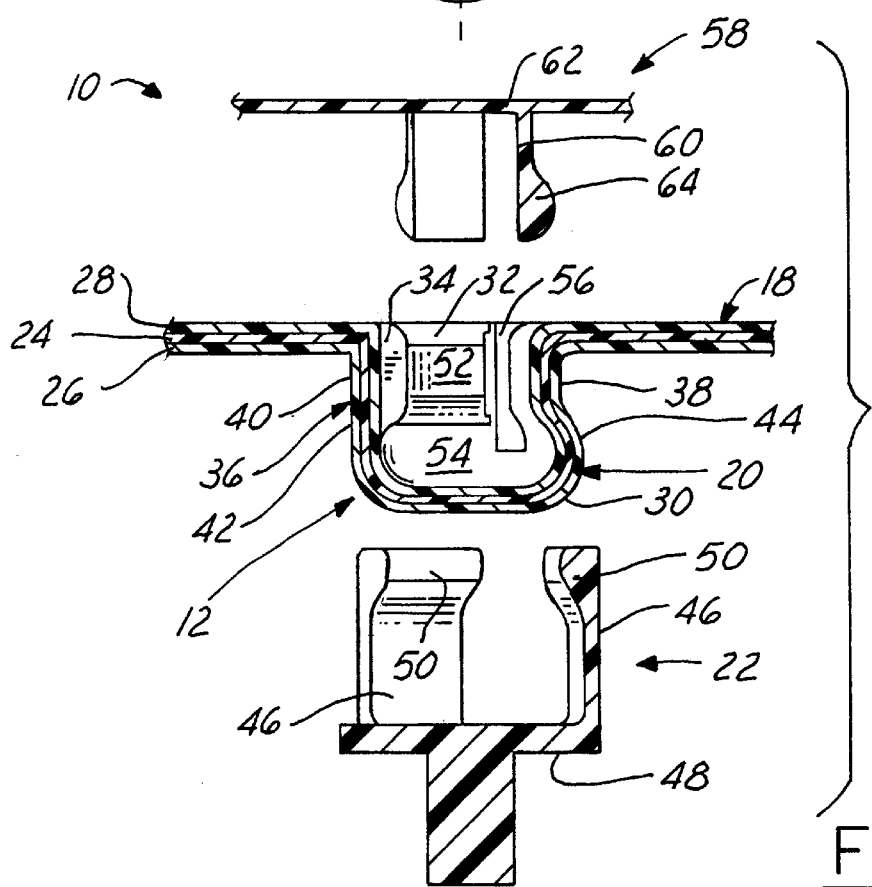
FIG. 2 is an exploded cross section view of the fuel tank fastener taken along line 2—2 of the FIG. 1.

Referring in more detail to the drawings, FIGS. 1 and 2 illustrate an integral fuel tank fastener 10 having a unitary fastener feature or hollow protuberance 12 with a central axis 14, which projects into a fuel chamber 16 defined by a multi-layered fuel tank shell 18. A female clip 22 of the fastener 10 snap fits over the protuberance 12. The clip 22 may be a stand alone clip attached to a device or a component but is often an integral part, encasement, or support of any variety of fuel system components such as a filter, pressure regulator, fuel level sensor, fuel pump, fuel delivery module, etc., described in patent application Ser. No. 09/997,907, filed Nov. 30, 2001, incorporated herein by reference. The fuel tank shell 18 may be a single layer of a plastic such as high density polyethylene, HDPE or, preferably, is a multi-layered shell having an intermediate layer or permeation barrier 24 which prevents permeation of hydrocarbon between fuel emissions and an inner layer 26 and an outer layer 28 which provides overall fuel tank structural strength and rigidity. The intermediate layer 24 is engaged continuously between the inner and outer layers 26, 28. Any discontinuity within the permeation barrier will degrade the integrity of the fuel tank and significantly contribute toward unwanted fuel emissions to atmosphere. An outer surface 30 of the protuberance 12 is provided by the inner layer 26 of the fuel tank shell 16. The hollow protuberance 12 also has a blind cavity 32 which is defined by an inner surface 34 of the protuberance 12 carried by the outer layer 28. The permeation barrier 24 is formed continuously throughout the protuberance 12 so as not to degrade the integrity of the fuel tank.

Typically, the intermediate layer 24 of the fuel tank shell 18 and thus protuberance 12, is made of ethyl vinyl alcohol, EVOH, plastic material and the inner and outer layers 26, 28 are made of the HDPE plastic material. Since the EVOH and HDPE will not directly bond or adhere together, bonding layers of adhesive are interposed between them. More particularly, the inner layer 26 is made of virgin HDPE, and the outer layer 28 is made of regrind HDPE material which is externally covered by a layer of black HDPE (carbon) mainly for UV protection and having electrical conductance to reduce the negative effects of electrostatic charge build-up.

The hollow protuberance 12 has an enlarged head 20 and a neck 36 disposed concentrically about the central axis 14 projecting into the fuel chamber 14. The neck 36 has a plurality of indentations or recesses 38 circumferentially and substantially equally spaced about the central axis 14 and defined by the outer surface 30. It is not required, however, that the recesses 38 be equally spaced. For instance, if proper orientation is critical, one recess can be larger to make the assembly process mistake-proof. Alternating between each recess 38 is a tangential column or rib 40 which extends along the axial length of the neck 36 and has an outer radial surface 42 which is part of the outer surface 30 and extends tangentially from an outer radial periphery 44 of the enlarged head 20. The radial surface 42 is parallel and generally concentric to the central axis 14.

The female clip 22 is engaged to the hollow protuberance 12, about the enlarged head 20, via a plurality of flexible and resilient fingers 46 which extend axially over the enlarged head 20 from the base 48 of the female clip 22. The fingers 46 are equally spaced circumferentially about the central axis 14 and each has at distal end element or tip 50 projecting radially inward into an associated recess 38. When the clip 22 is so engaged, the tangential ribs 40 which extend radially outward between the fingers 50 of the female clip 22 prevent rotation of the female clip 22 about the central axis 14 with respect to the protuberance 12. As illustrated in FIGS. 1 and 2, the fastener 10 has three recesses 38 and three associated fingers 46 each having a tip 50 receivable in a recess 38. The clip 22 may also take the form of a clamping device (not shown) which may also include a twist-and-lock feature.

The blind cavity 32 of the hollow protuberance 12 has a bore 52 defined by the neck 36, and/or the black inner surface 34 of the protuberance 12 which is carried by the outer or external surface of the outer layer 28. The bore 52 communicates with an enlarged chamber 54 defined by the enlarged head 20. The bore 52 has axially extending channels 56 formed by the tangential columns 40 on the reverse side of the shell 18.

If desirable, a male clip 58 can snap-fit into the blind cavity 32. Like the female clip 22, the male clip 58 may be an integral part of any variety of components or a stand alone clip attached to a component. For instance, the male clip 58 can be a unitary portion of a wiring harness support designed to hold a wiring harness close to the external fuel tank surface. The male clip 58 has a series of cantilevered fingers 60 (shown having three) which project from a base 62. Each finger 60 has at its distal end a tip or detent 64 which projects radially outward. When the male clip 58 is inserted into the blind cavity 32 the fingers 60 flex radially inward past the bore 52 as they slide against the inner surface 34 until they snap or unflex radially outward and align axially within the enlarged chamber 54. Each cantilevered finger 60 or detent 64 has a circumferential width which is wider than the channels 56 to prevent unintentional release of the male clip 58 from the blind cavity 32.

Figure 3:
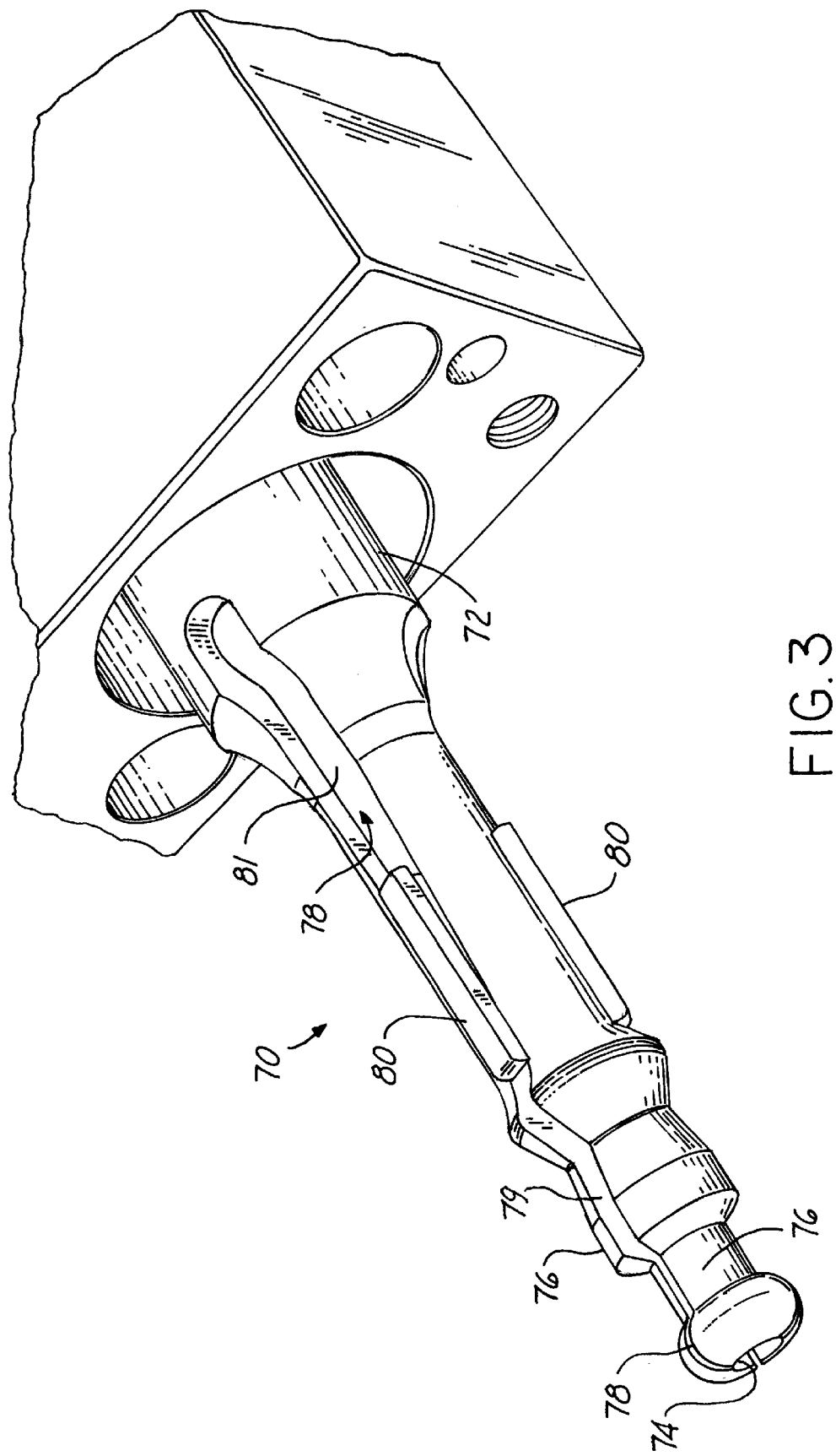
FIG. 3 is a perspective view of a DME standard collapsible mini core tool.

A collapsible tool 70 shown in FIG. 3 and manufactured by DME Incorporated is used in forming the protuberance 12. The tool 70 has a hollow body 72, with a longitudinal throughbore 74 and three flexible and resilient fingers 76 with longitudinal slots 79 communicating laterally with the throughbore 74 and disposed between the fingers 76 in which three segments 80 each integral with an actuator rod 81 are slidably received for axial movement between retracted and advanced positions. In their advanced position the segments 80 in conjunction with the interleaved fingers 76 form a core mold which the protuberance 12 is formed and have the configuration of the hollow interior of the protuberance. In their retracted position the segments 80 leave a space into which the distal ends of the fingers 76 can collapse or flex generally radially inward to permit retraction and withdraw of the tool 70 from the interior of the formed protuberance 12.

Figure 4:
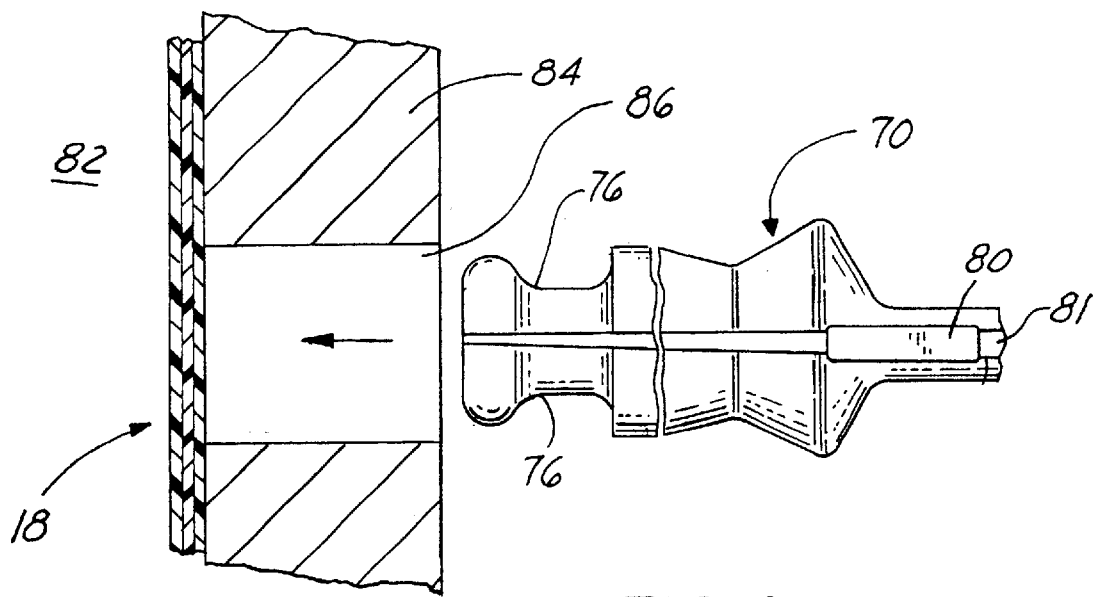
FIG. 4 is a cross section view of a fuel tank shell blown or expanded against a mold and prior to insertion of the collapsible tool.
Figure 5:
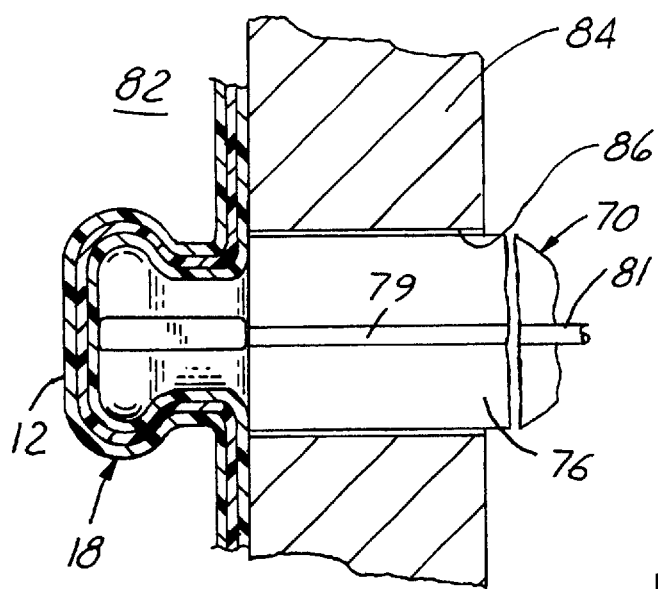
FIG. 5 is a cross section view of the fuel tank shell expanded against the mold and with the collapsible tool inserted into the mold and expanded to form the protuberance.

The protuberance 12 is formed during the blow molding process of the plastic fuel tank. As illustrated in FIGS. 4 and 5, a hot and pliable coextruded parisons of all the layers of plastic material is disposed in a cavity 82 of a mold 84 which is then closed and the parison is molded to form the one piece fuel tank shell 18. Then the collapsible tool 70, is inserted through a hole 86 of the mold 82 while in the un-collapsed state. With the fuel tank shell 18 still hot and pliable, the tool 70 is pushed into the fuel tank shell 18, thereby forming the hollow protuberance 12 while the molding pressure does the final forming. The fuel tank shell 18 is allowed to cool within the mold 60 prior to collapsing the tool 70. Once cooled sufficiently to retain its shape and configuration, the tool can be retracted and withdrawn from the cavity 82 of the mold 84 and the mold 84 opened and the fuel tank shell 18 removed.

While the forms of the invention herein disclose constitute a presently preferred embodiment, many others are possible. For instance, the protuberance 12 need not project into the fuel chamber but may project out of the fuel tank provided an appropriate split recess in the cavity or other tooling can be provided in the mold to form the outwardly projecting protuberance during the manufacturing process. Furthermore, the protuberance can include male or female threads for engaging various attachments. It is not intended herein to mention all the possible forms or ramifications of the invention. It is understood that the terms used herein are merely descriptive rather than limiting and that various changes may be made without departing from the spirit or scope of the invention.

What is claimed is:

1. A unitary fastener feature of a fuel tank for engaging a resilient clip, the fastener feature comprising:
   a multi-layer fuel tank shell having an inner layer and an outer layer;
   a fuel chamber defined by the inner layer of the fuel tank shell; and
   an elongated hollow protuberance carried unitarily by the fuel tank shell and projecting into the fuel chamber, the hollow protuberance having a blind cavity, a head, and a neck, and the cavity is defined by the outer layer.

2. The unitary fastener feature as set forth in claim 1 wherein the protuberance has a central axis, an enlarged head and extends concentrically along the central axis with the neck being disposed axially between the fuel tank shell and the enlarged head.

3. The unitary fastener feature as set forth in claim 2 wherein the neck has a plurality of recesses circumferentially spaced about the central axis and defined by the inner layer.

4. The unitary fastener feature as set forth in claim 3 wherein the fuel tank shell has an intermediate layer engaged continuously between the outer and inner layers.

5. The unitary fastener feature as set forth in claim 4 wherein the intermediate layer of the fuel tank shell is not exposed through either the outer or inner layers.

6. The unitary fastener feature as set forth in claim 5 wherein the inner, outer and intermediate layers are made of plastic.

7. The unitary fastener feature as set forth in claim 6 wherein the inner and outer layers of the fuel tank shell are made of a high density polyethylene plastic.

8. An integral fuel tank fastener comprising:
   a multi-layer fuel tank shell having a continuous first layer engaged to a continuous second layer;
   a fastener feature being an elongated hollow protuberance carried unitarily by and projecting from the fuel tank shell, the hollow protuberance having a central axis, a blind cavity, an inner surface, an outer surface and an enlarged head, the inner surface defining the blind cavity and carried by the second layer, the outer surface carried by the first layer, the protuberance projecting axially and concentrically along the central axis to the enlarged head; and a female clip snap fitted over the enlarged head of the protuberance, the female clip having a base, and a plurality of flexible fingers projecting axially from the base toward the second layer of the fuel tank shell, the plurality of fingers being axially aligned with and disposed radially outward from the head, the plurality of pronged fingers being spaced circumferentially about the central axis, each one of the plurality of fingers having a tip projecting radially inward from a distal end of the armature, the tips being disposed radially inward from the head.

9. The fastener as set forth in claim 8 further comprising a neck disposed concentrically about the central axis, the head projecting axially from the neck, the neck having a plurality of recesses defined by the outer surface of the protuberance, and each of the tips being disposed within a respective one of the plurality of recesses thereby preventing the female clip from rotating about the central axis of the protuberance.

10. The fastener as set forth in claim 9 wherein the first layer of the fuel tank shell defines a fuel chamber.

11. The fastener as set forth in claim 10 wherein the fuel tank shell has an intermediate layer engaged between the first and second layers, and wherein the intermediate layer of the fuel tank shell is not exposed through either the first or second layers.

12. The fastener as set forth in claim 11 wherein the intermediate layer is made of a plastic material differing from the plastic material of the first and second layers.

13. The fastener as set forth in claim 12 wherein the first and second layers of the fuel tank shell are made of a high density polyethylene plastic.

14. The fastener as set forth in claim 9 further comprising:

the cavity of the protuberance having a bore and an enlarged chamber, the bore defined by the neck and the chamber defined by the head; and a male clip interference fitted into the blind cavity of the protuberance, the male clip having a base, and a plurality of flexible cantilevered fingers projecting axially from the base toward the second layer of the fuel tank shell, the plurality of cantilevered fingers being spaced circumferentially about the central axis, each of the cantilevered fingers having a tip projecting radially outward from a distal end of the cantilevered finger and engaging the second layer of the fuel tank shell within the enlarged chamber.

* * * * *